United States Patent [19]

Kurono et al.

[11] Patent Number: 5,392,724
[45] Date of Patent: Feb. 28, 1995

[54] SEWING SYSTEM

[75] Inventors: Yoshikazu Kurono, Aichi; Fumiaki Asano, Nagoya, both of Japan

[73] Assignee: Brother Kogyo Kabushiki Kaisha, Nagoya, Japan

[21] Appl. No.: 229,407

[22] Filed: Apr. 18, 1994

[30] Foreign Application Priority Data

Apr. 23, 1993 [JP] Japan .................. 5-120865

[51] Int. Cl.⁶ .................. D05B 21/00; D05B 25/00
[52] U.S. Cl. .................. 112/121.12; 112/103; 112/155
[58] Field of Search .................. 112/121.12, 121.11, 112/103, 102, 155, 445, 453, 456, 457, 458; 364/470

[56] References Cited

U.S. PATENT DOCUMENTS

| | | | |
|---|---|---|---|
| 4,413,574 | 11/1983 | Hiroto et al. | 112/121.12 |
| 5,218,916 | 6/1993 | Kurono et al. | 112/155 X |
| 5,253,599 | 10/1993 | Hashiride | 112/155 X |
| 5,313,896 | 5/1994 | Hashiride | 112/155 X |

*Primary Examiner*—Peter Nerbun
*Attorney, Agent, or Firm*—Oliff & Berridge

[57] ABSTRACT

A sewing system includes a first automatic sewing machine and at least one second automatic sewing machine. The first automatic sewing machine includes a RAM for storing stitch data. The stitch data is processed into data for primarily controlling a needle position, and the data thus processed is stored in the RAM. The first automatic sewing machine further includes a data transmitting device for outputting the processed stitch data to the outside of the sewing machine. The second automatic sewing machine includes a data receiving device for receiving the processed stitch data from the data transmitting device in the first automatic sewing machine. When receiving the processed stitch data from the data transmitting device in the first automatic sewing machine, the second automatic sewing machine starts sewing according to the processed stitch data thus received.

20 Claims, 10 Drawing Sheets

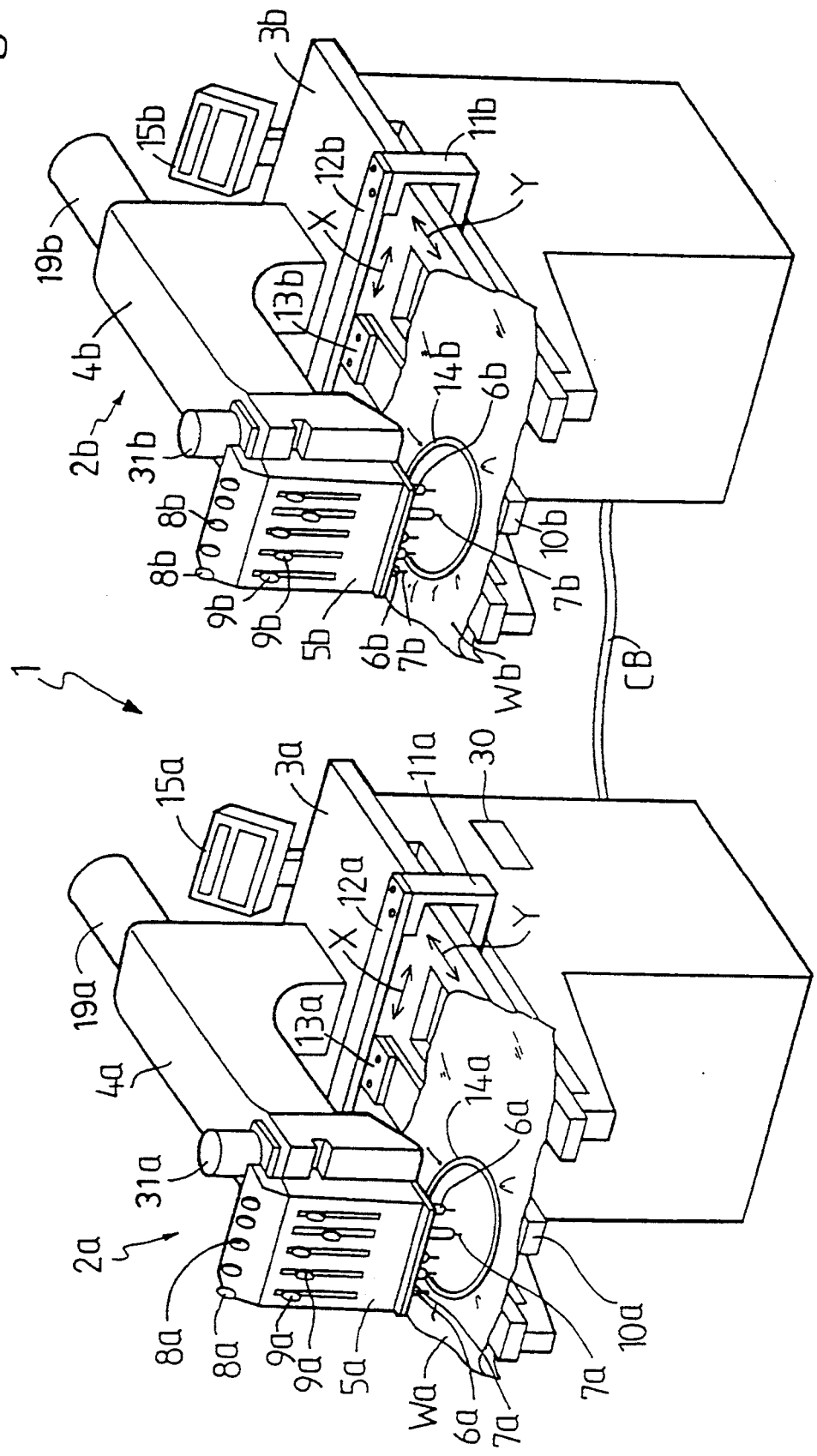

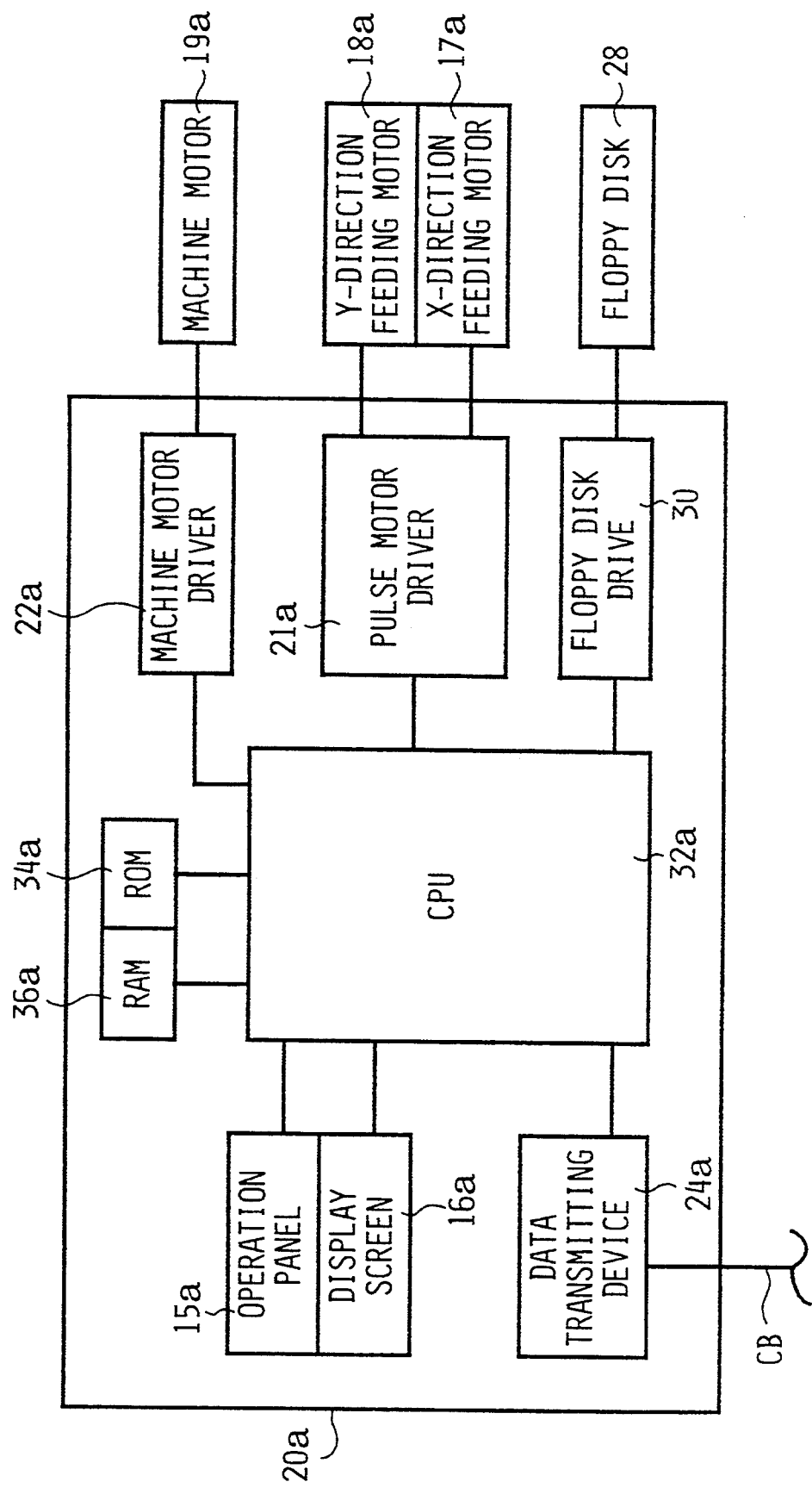

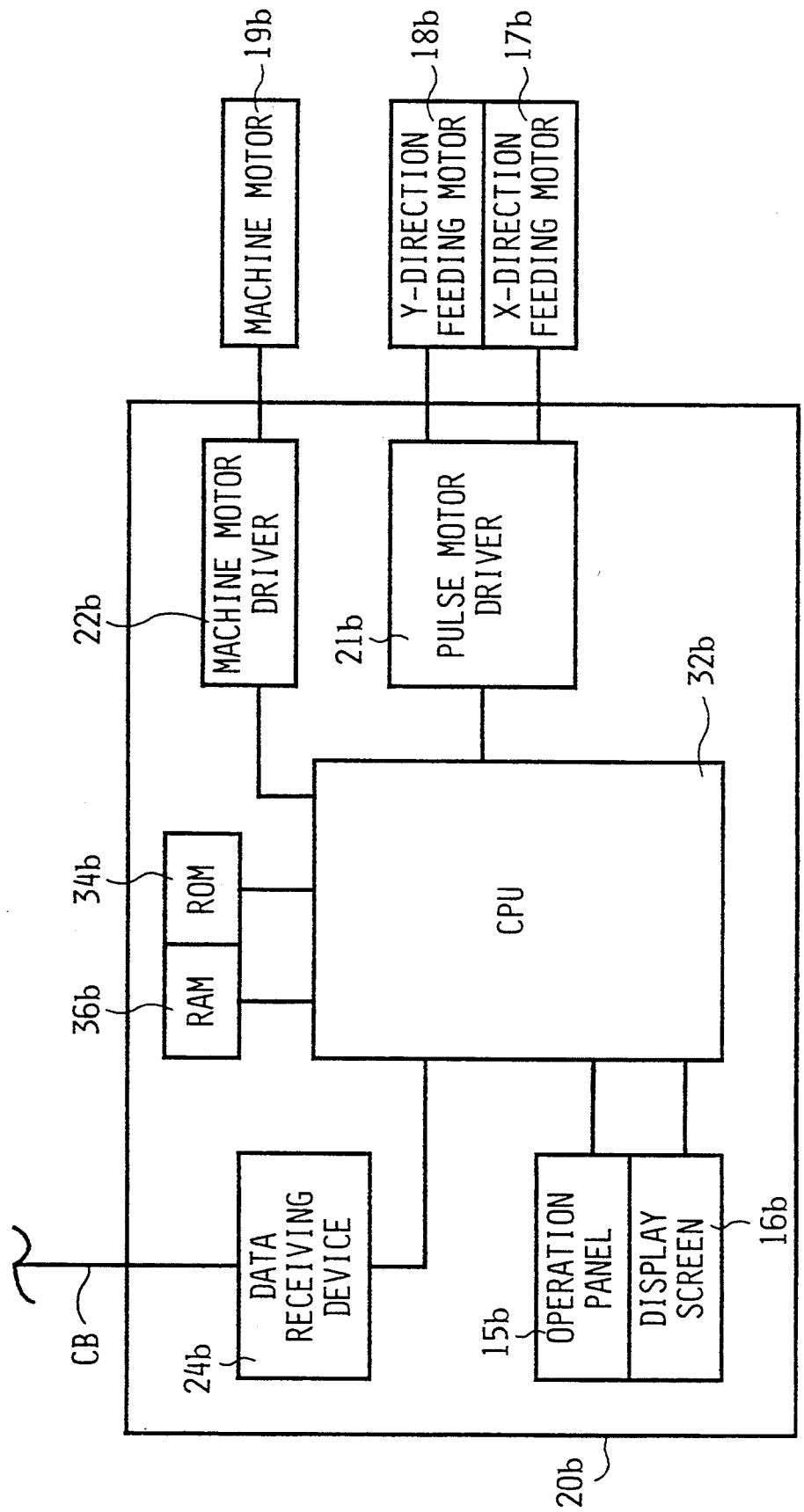

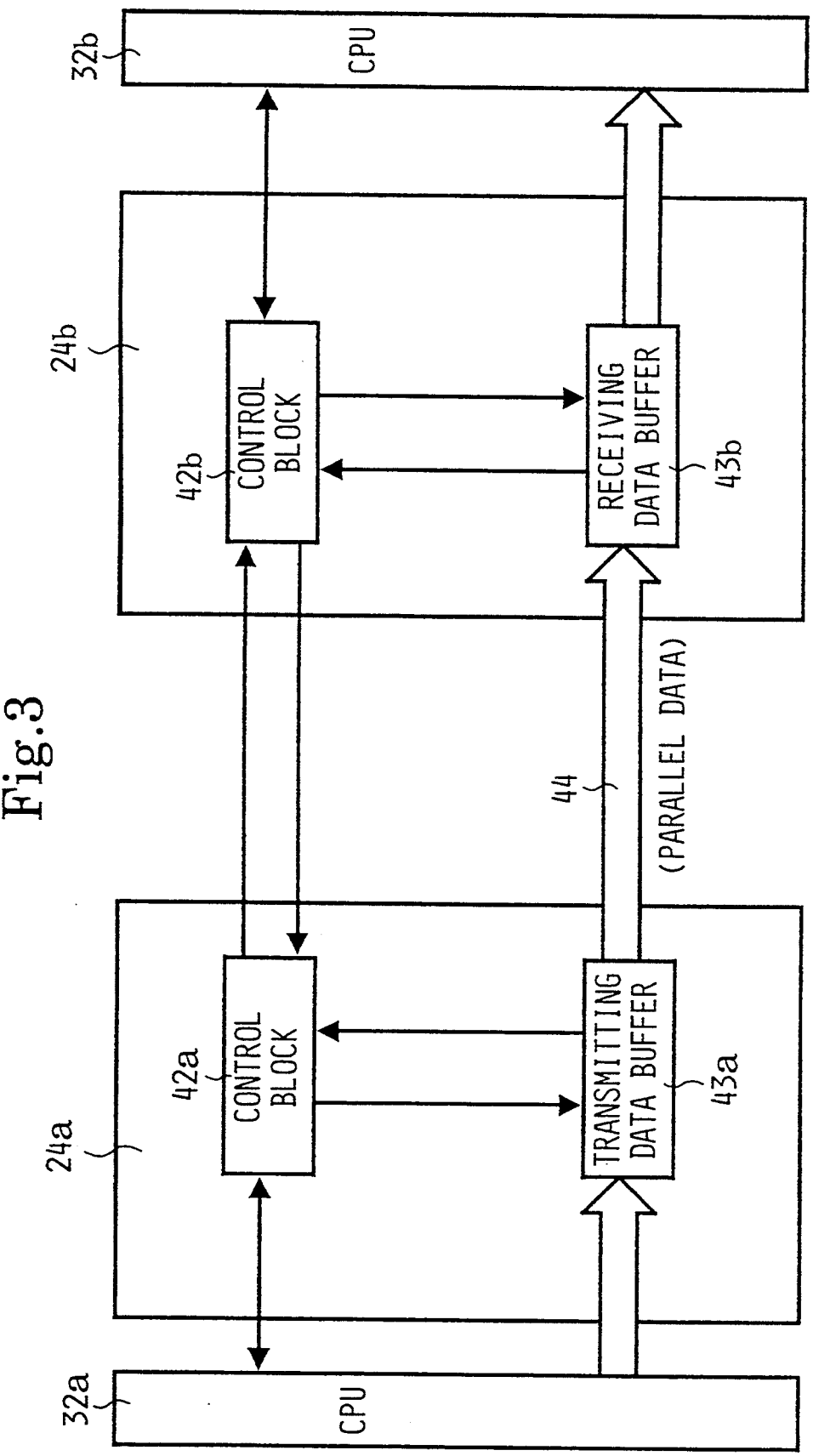

FIG. 5B

| START | |
|---|---|
| S501 | READ KEY DEPRESSED ? |
| S502 | READ OUT AND DISPLAY FILE NAME |
| S503 | SCROLL KEY DEPRESSED ? |
| S504 | DISPLAY FILE NAME BASED ON OPERATION OF SCROLL KEY |
| S505 | INPUT KEY DEPRESSED ? |
| S506 | READ OUT AND STORE STITCH DATA |
| S507 | END KEY DEPRESSED ? |
| S508 | EDIT KEY DEPRESSED? |
| S509 | START EDIT MODE |
| S510 | DATA TRANSMITTING KEY DEPRESSED ? |
| S511 | START TRANSMITTING MODE |
| S512 | END KEY DEPRESSED ? |
| END | |

FIG.6B

| START | |
|---|---|
| S601 | RECEIVING KEY DEPRESSED ? |
| S602 | START RECEIVING MODE |
| S603 | STITCH DATA PRESENT ? |
| S604 | GENERATE READING COMMAND OF STITCH DATA |
| S605 | END KEY DEPRESSED ? |
| S606 | ALL BYTES RECEIVED ? |
| S607 | END KEY DEPRESSED ? |
| S608 | DISPLAY COMPLETION OF RECEIVING |
| S609 | SEWING START KEY DEPRESSED ? |
| S610 | START SEWING OPERATION |
| S611 | END KEY DEPRESSED ? |
| END | |

SEWING SYSTEM

BACKGROUND OF THE INVENTION

1. Field of the Invention

The present invention relates to a sewing system including a plurality of sewing machines, one having a data transmitting device and the others having data receiving devices connected to the data transmitting device. More particularly, the invention relates to a sewing system wherein stitch data is transmitted from the data transmitting device of the sewing machine on the transmitting side to the data receiving devices of the sewing machines on the receiving side. Each sewing machine on the receiving side can form stitches on a workpiece according to the received stitch data.

2. Description of the Related Art

A conventional sewing system includes a host computer for centrally controlling stitch data or the like and one or more sewing machines connected to the host computer. The stitch data recorded in the host computer is edited, such as being expanded, contracted, or rotated, in the host computer, and a plurality of pieces of stitch data are combined in the host computer. Then, such processed data is transmitted to each sewing machine, which in turn performs a sewing operation according to the received data.

In another case where a plurality of sewing machines are independently used without the host computer, each sewing machine is equipped with memory means for storing stitch data, data reading means for reading the stitch data from the memory means, and data editing means for processing the stitch data. In this case, an operator operates all the sewing machines in the same manner.

However, the conventional sewing system has the following problems.

(1) In the case of controlling two or more sewing machines by using a host computer, a commercially available computer is used as the host computer in most cases. An operator is required to have a high operating technique for the computer as well as an operating technique for the sewing machines. Further, an operational environment for the computer is limited, and therefore a large space or the like for the whole system is necessary. Also, a heavy investment in the computer which has no sewing function is necessary, causing an increase in cost.

(2) In the case of using two or more sewing machines without a host computer, and performing the same sewing operation in the two or more sewing machines, the operator must perform the same operation on all the sewing machines. Thus, the efficiency of the sewing operation is reduced.

SUMMARY OF THE INVENTION

It is accordingly an object of the present invention to provide a sewing system that can realize high operability and cost reduction by connecting a plurality of sewing machines without connecting a host computer thereto to transmit stitch data from one of the sewing machines, which serves as a host computer, to the other sewing machines.

According to the present invention, a sewing system includes a first automatic sewing machine and at least one second automatic sewing machine, each of the first and second automatic sewing machines including stitch forming means for forming stitches on a workpiece. A workpiece moving means moves the workpiece relative to the stitch forming means, and sewing control means controls the driving of the stitch forming means and the workpiece moving means according to stored stitch data. The first automatic sewing machine further includes memory means for storing the stitch data, data editing means for processing the stitch data stored in the memory means and allowing the processed stitch data to be stored into the memory means, and data transmitting means for outputting the stitch data processed by the data editing means to the outside of the first automatic sewing machine. The second automatic sewing machine further includes data receiving means for receiving the stitch data output from the data transmitting means. When the stitch data output from the data transmitting means in the first automatic sewing machine is received by the data receiving means in the second automatic sewing machine, a sewing operation according to the received stitch data is carried out by the second automatic sewing machine.

In operation, the stitch forming means of each automatic sewing machine forms stitches on a workpiece. The workpiece moving means of each automatic sewing machine moves the workpiece relative to the stitch forming means. The sewing control means of each automatic sewing machine controls the stitch forming means and the workpiece moving means to drive according to stitch stored data and perform a sewing operation in an arbitrary position on the workpiece.

The memory means of the first automatic sewing machine stores the stitch data. The data editing means processes the stitch data stored in the memory means and allows the processed stitch data to be stored into the memory means. The data transmitting means outputs the stitch data processed by the data editing means to the outside of the first automatic sewing machine.

The data receiving means of the second automatic sewing machine receives the stitch data output from the data transmitting means. When receiving the stitch data output from the first automatic sewing machine, the second automatic sewing machine starts sewing according to the received stitch data.

Other objects, features and advantages of the invention will be more fully understood from the following detailed description and appended claims when taken with the accompanying drawings.

BRIEF DESCRIPTION OF THE DRAWINGS

FIG. 1 is a perspective view showing a basic construction of a sewing system in a preferred embodiment according to the present invention;

FIGS. 2A and 2B are block diagrams showing an electrical construction of the sewing system;

FIG. 3 is a block diagram showing an electrical construction of transmitting and receiving devices provided in the sewing system;

FIG. 5B is a table listing the steps of the flowchart of FIG. 5A;

FIG. 6B is a table listing the steps of the flowchart of FIG. 6A; and

DESCRIPTION OF PREFERRED EMBODIMENTS

Figure 4A:
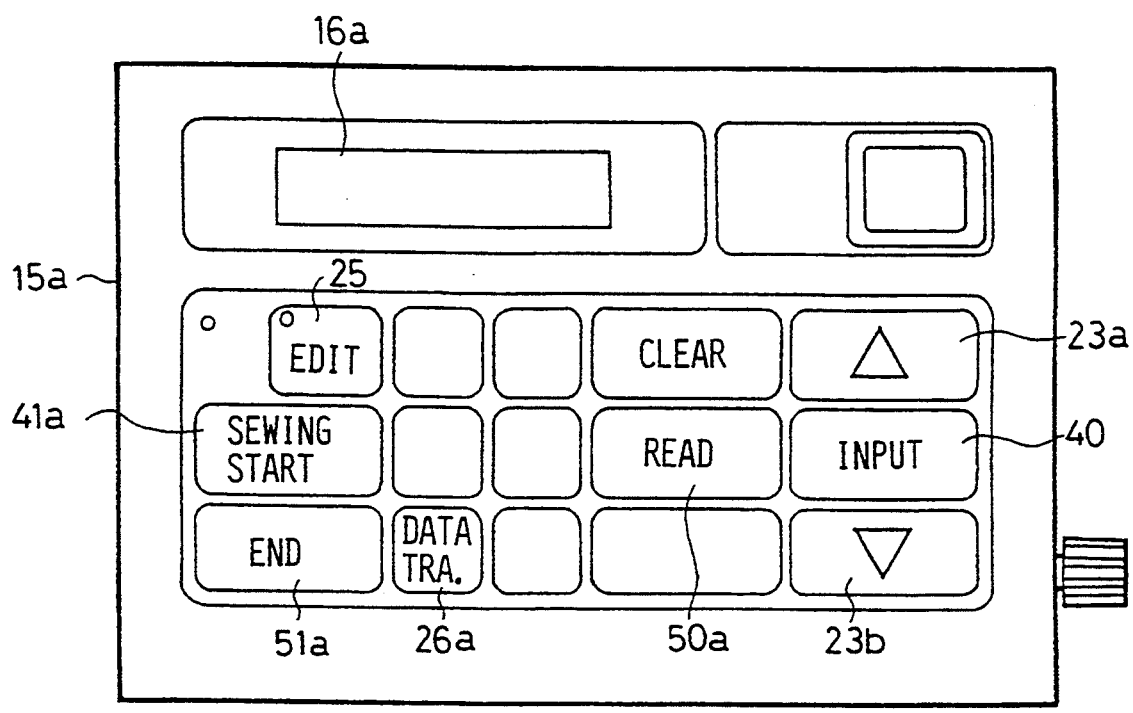
FIGS. 4A and 4B are plan views of operation panels provided in the sewing system.

Preferred embodiments of the present invention are described with reference to the drawings, in which the present invention is applied to embroidering machines.

Referring to FIG. 1, reference numeral 1 generally designates a sewing system comprising two embroidering machines 2a and 2b as first and second automatic sewing machines electrically connected together by a cable CB. The embroidering machines 2a and 2b are provided with machine tables 3a and 3b, respectively. Machine arms 4a and 4b are provided on the machine tables 3a and 3b, respectively. Needle bar support cases 5a and 5b are laterally movably mounted on the machine arms 4a and 4b at the front ends thereof, respectively. A plurality of needle bars 6a and 6b (five for each in this preferred embodiment) are vertically movably supported in the needle bar support cases 5a and 5b, respectively. A plurality of needles 7a and 7b are mounted to the needle bars 6a and 6b at the lower ends thereof, respectively. A plurality of needle threads are supplied from a plurality of thread supply sources through a plurality of thread tension regulators 8a and 8b and a plurality of thread take-up levers 9a and 9b to the needles 7a and 7b, respectively.

The needle bar support cases 5a and 5b are laterally moved by needle bar selecting motors 31a and 1b, respectively, to select required ones of the needle bars 6a and 6b. The selected needle bars 6a and 6b are so driven by machine motors 19a and 19b, respectively, to be vertically reciprocated, thereby performing a sewing operation.

Machine beds 10a and 10b extend frontward from the front ends of the machine tables 3a and 3b, respectively. In the machine beds 10a and 10b, there are provided loop takers (rotating hooks) for forming stitches on workpieces Wa and Wb in cooperation with the vertical reciprocation of the needles 7a and 7b, respectively.

Y-direction moving arms 11a and 11b are provided on the machine tables 3a and 3b, respectively. The Y-direction moving arms 11a and 11b are movable in the Y-direction in the X-Y plane (i.e., the longitudinal direction of each sewing machine) by Y-direction feeding motors 18a and 18b (see FIGS. 2A and 2B), respectively.

Laterally extending support members 12a and 12b are fixed to the Y-direction moving arms 11a and 11b at the upper end portions thereof, respectively. X-direction moving arms 13a and 13b are provided on the support members 12a and 12b, respectively. The X-direction moving arms 13a and 13b are movable in the X-direction in the X-Y plane (i.e., the lateral direction of each sewing machine) by X-direction feeding motors 17a and 17b (see FIGS. 2A and 2B), respectively. Embroidery frames 14a and 14b for detachably supporting the workpieces Wa and Wb are mounted to the X-direction moving arms 13a and 13b at the front ends thereof, respectively.

Accordingly, the workpieces Wa and Wb supported by the embroidery frames 14a and 14b are moved in the Y-direction by the Y-direction moving arms 11a and 11b driven by the Y-direction feeding motors 18a and 18b, respectively, and are also moved in the X-direction by the X-direction moving arms 13a and 13b driven by the X-direction feeding motors 17a and 17b, respectively. The combination of such movements in the X-direction and the Y-direction makes the formation of various stitch patterns possible, such as arbitrary letters and figures on the workpieces Wa and Wb.

Operation panels 15a and 15b are provided on the machine tables 3a and 3b, respectively, to instruct the conversion of stitch data, the transmitting and receiving of stitch data, and the execution of sewing. A floppy disk drive 30 is mounted in the embroidering machine 2a. The floppy disk drive 30 serves as a stitch data reading device for reading stitch data stored in a floppy disk 28 (see FIG. 2A). The stitch data includes data for forming embroidery patterns.

The construction of a control device in the sewing system in the preferred embodiment is shown in FIG. 2A and 2B.

Reference numerals 20a and 20b designate control panels mounted in the embroidering machines 2a and 2b, respectively. The machine motors 19a and 19b for driving the needle bars 6a and 6b are connected to the control panels 20a and 20b through machine motor drivers 22a and 22b, respectively. The X-direction feeding motor 17a and the Y-direction feeding motor 18a for moving the embroidery frame 14a are connected through a pulse motor driver 21a to the control panel 20a. Similarly, the X-direction feeding motor 17b and the Y-direction feeding motor 18b for moving the embroidery frame 14b are connected through a pulse motor driver 21b to the control panel 20b. Further, the floppy disk 28 is connected to the control panel 20a through the floppy disk drive 30.

The operation panel 15a and a display screen 16a associated therewith are provided on the surface of the control panel 20a in the first automatic sewing machine 2a and are connected to a CPU 32a as control means. Further, the CPU 32a is connected to a ROM 34a for previously storing a control program and various message data to be displayed on the display screen 16a and a RAM 36a for temporarily storing stitch data and working data. Further, a data transmitting device 24a for transmitting stitch data to the outside of the sewing machine is connected to the CPU 32a.

On the other hand, the operation panel 15b and a display screen 16b associated therewith are provided on the surface of the control panel 20b in the second automatic sewing machine 2b and are connected to a CPU 32b as control means. Further, the CPU 32b is connected to a ROM 34b for previously storing a control program and various message data to be displayed on the display screen 16b and a RAM 36b for temporarily storing stitch data and working data. Further, a data receiving device 24b for receiving stitch data output from the data transmitting device 24a is connected to the CPU 32b.

FIG. 3 shows a detailed construction of the data transmitting device 24a and the data receiving device 24b.

The data transmitting device 24a comprises a control block 42a and a transmitting data buffer 43a. Both the control block 42a and the transmitting data buffer 43a are connected to the CPU 32a.

The data receiving device 24b comprises a control block 42b and a receiving data buffer 43b. Both the control block 42b and the receiving data buffer 43b are connected to the CPU 32b.

The control block 42a and the control block 42b are connected to each other by a communication line. The transmitting data buffer 43a and the receiving data buffer 43b are connected to each other via a data bus 44. The control block 42a and the control block 42b are formed of hard circuits for effecting communications of control signals to the elements connected thereto.

Figure 4B:
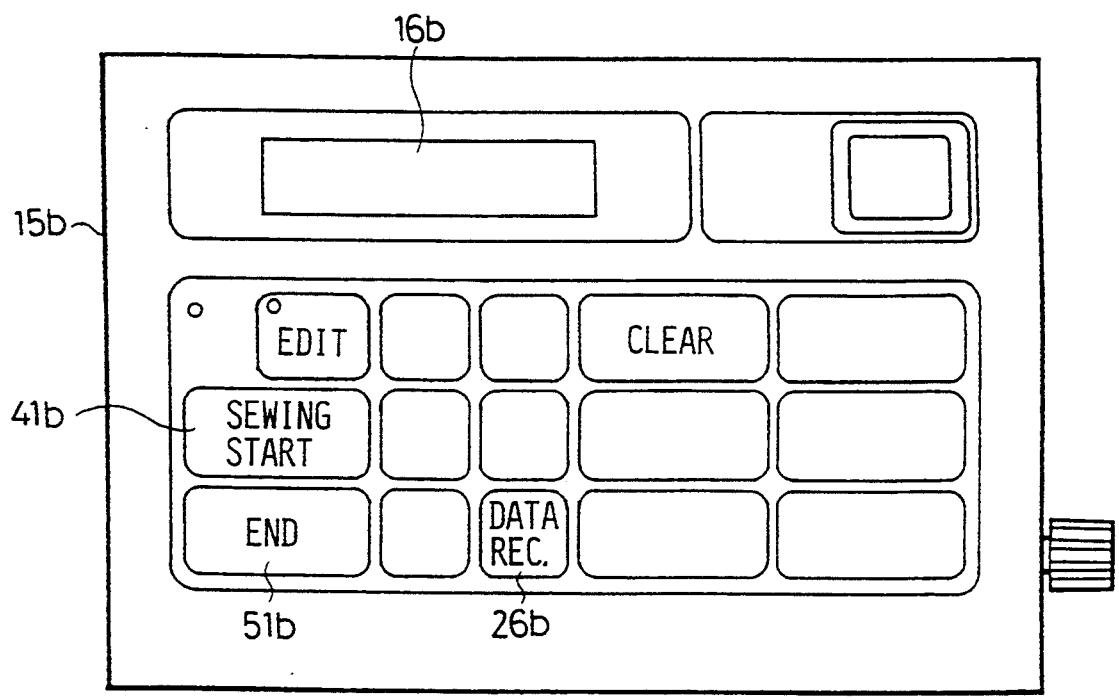
Figure 5A:
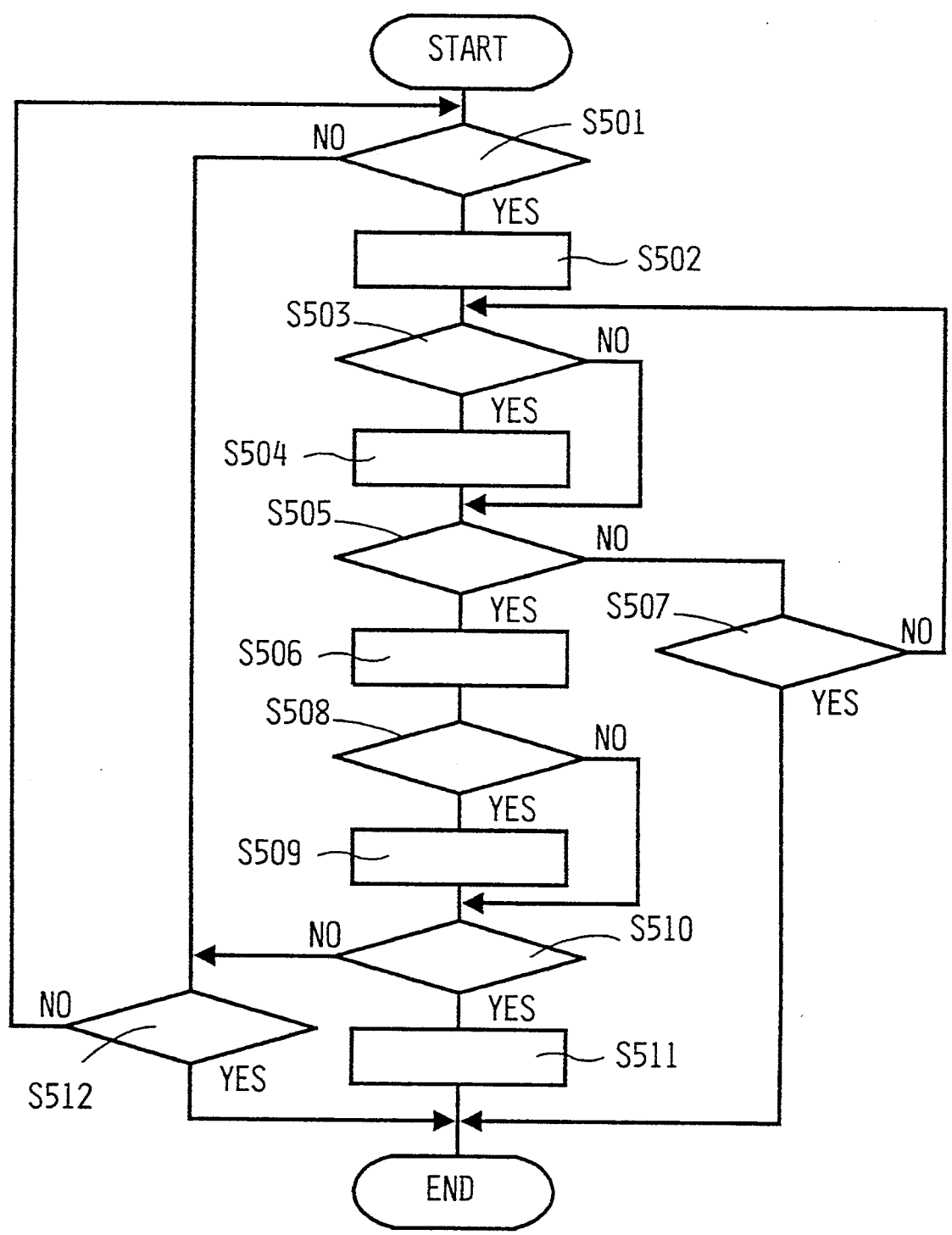
FIG. 5A is a flowchart showing the operation of transmitting stitch data.
Figure 6A:
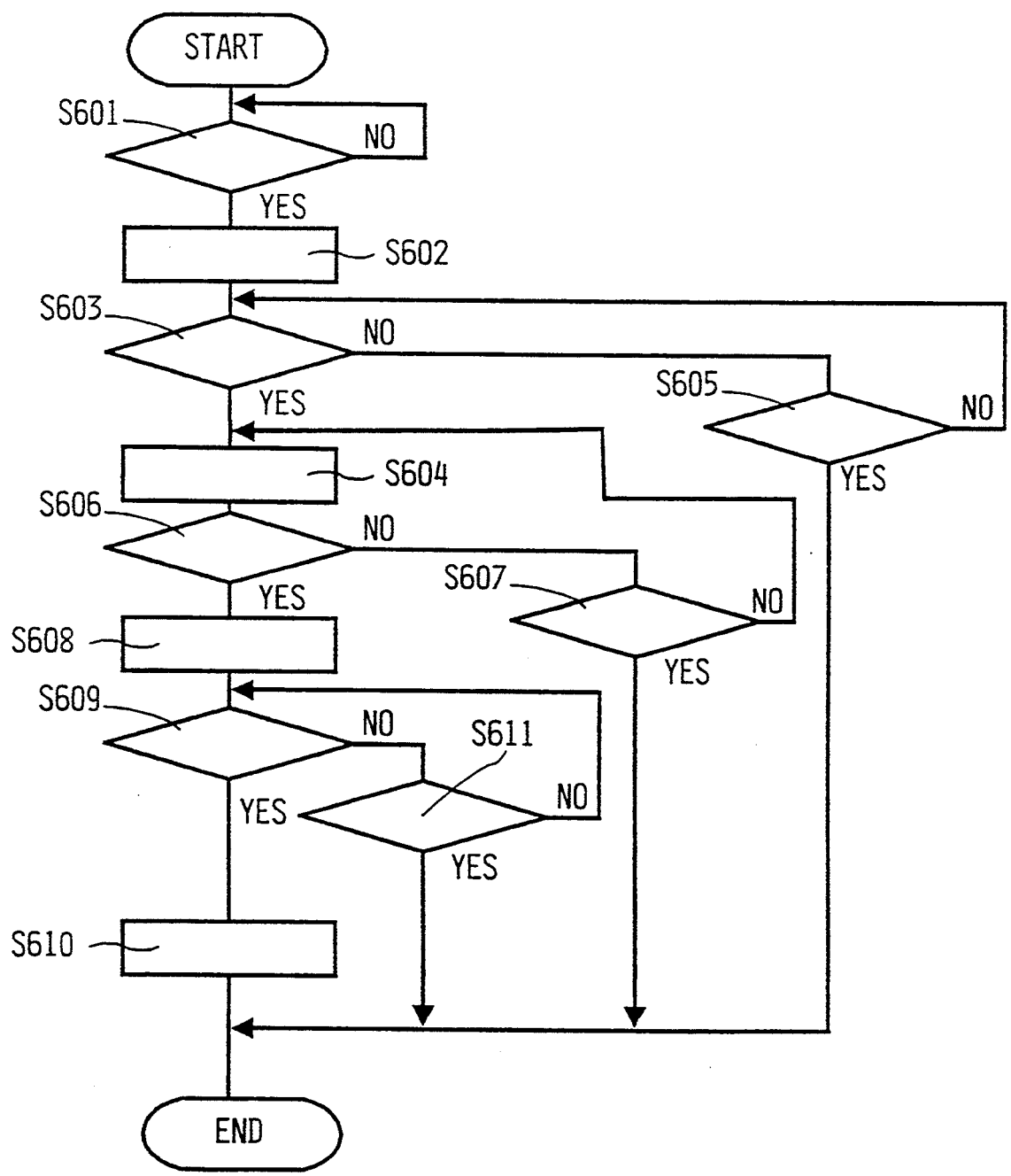
FIG. 6A is a flowchart showing the operation of receiving the stitch data.

The construction of the operation panels 15a and 15b is described referring to FIGS. 4A and 4B.

Referring to FIG. 4A, which is a top plan view of the operation panel 15a provided in the first automatic sewing machine 2a, the operation panel 15a includes the display screen 16a, two scroll keys 23a and 23b, an input key 40, an edit key 25, a data transmitting key 26a, a sewing start key 41a, a read key 50a and an end key 51a.

The scroll keys 23a and 23b are keys for sequentially scrolling on the display screen 16a recorded file names of stitch pattern data recorded in the floppy disk 28. The input key 40 is a key for reading the stitch pattern data corresponding to the recorded file name displayed on the display screen 16a and allowing the read data to be stored into the RAM 36a. The edit key 25 is a key for starting an edit mode to convert the stitch pattern data read from the floppy disk 28. An operating method for the conversion is the same as that in a conventional embroidering machine; so, the explanation thereof will be omitted herein. The data transmitting key 26a is a key for starting a transmitting mode to transmit the stitch pattern data stored in the RAM 36a. The sewing start key 41a is a key for executing sewing according to the stitch pattern data stored in the RAM 36a. The read key 50a is a key for reading file names of stitch data stored in the floppy disk 28 by the floppy disk drive 30. The end key 51a is a key for interrupting a current operation.

Referring next to FIG. 4B, which is a top plan view of the operation panel 15b provided in the second automatic sewing machine 2b, the operation panel 15b includes the display screen 16b, a data receiving key 26b, a sewing start key 41b and an end key 51b. The data receiving key 26b is a key for starting a receiving mode to receive stitch pattern data from the data transmitting device 24a in the first automatic sewing machine 2a and allowing the received data to be stored into the RAM 36b. The sewing start key 41b is a key for executing sewing according to the stitch pattern data stored in the RAM 36b. The end key 51b is a key for interrupting a current operation.

In operation of this preferred embodiment, the first automatic sewing machine 2a and the second automatic sewing machine 2b perform the same sewing operation.

FIGS. 5A, 5B, 6A and 6B are flowcharts and corresponding tables showing the transmitting and receiving operation for stitch pattern data.

In the first automatic sewing machine 2a, the CPU 32a determines whether the read key 50a is depressed or not (S501). When the read key 50a is depressed, file names of stitch data stored in the floppy disk 28 are read by the floppy disk drive 30 based on controlling of the CPU 32a, and the first one of the read file names is displayed on the display screen 16a (S502). If the file name displayed is undesired, an operator can change the file name displayed to a desired file name by operation of the scroll keys 23a and 23b. Therefore, the CPU 32a determines whether one of scroll keys 23a and 23b is depressed or not (S503). When the scroll key 23a or 23b is depressed, the displayed file name is changed to the other file name read at the step S502 according to an operation of the scroll key 23a or 23b (S504). Then, the CPU 32a determines whether the input key 40 is depressed or not (S505). When the input key 40 is depressed, the stitch data corresponding to the displayed file name is read out from the floppy disk 28 and stored into the RAM 36a (S506). When none of the scroll keys 23a and 23b is depressed at step S503, the operation goes directly to the step S505. When the end key 51a is depressed instead of the input key 40 (S507), the transmitting operation is interrupted.

Then, the CPU 32a determines whether the edit key 25 is depressed or not (S508). When the edit key 25 is depressed, an editing mode for editing the stitch data stored in the RAM 36a is started. The editing of the stitch data includes expansion, contraction, rotation of patterns, change of letter thickness, and change of thread density, for example. Further, other pattern data and letter data may be additionally read, and all the read data may be assembled. The data thus edited is stored into the RAM 36a as stitch data constituted mainly of data indicating the positional relation of the needle (S509). A method of editing the stitch data and the constitution of the stitch data are known in the art, e.g., U.S. Pat. No. 4,413,574, the disclosure of which is herein incorporated by reference.

This stitch data is in such a form that sewing can be performed even in a sewing machine having the simplest construction of a data processing section. Then, the CPU 32a determines whether the data transmitting key 26a is depressed or not (S510). When the data transmitting key 26a is depressed, a transmitting mode is started. In the transmitting mode, the CPU 32a controls the data transmitting device 24a to transmit the stitch data stored in the RAM 36a to the second automatic sewing machine 2b (S511). When the data transmitting key 26a is not depressed at the step S510, the CPU 32a determines whether the end key 51a is depressed or not (S512). When the end key 51a is depressed, the transmitting operation is interrupted. When the read key 50a is depressed instead of the end key 51a, the operation returns to the step S502.

When the first automatic sewing machine 2a is in the transmitting mode and the second automatic sewing machine 2b receives the stitch data from the first automatic sewing machine 2a, it is necessary that the operator depresses the data receiving key 26b to enter the second automatic sewing machine 2b in a receiving mode.

Accordingly, in the second automatic sewing machine 2b, the CPU 32b determines whether the data receiving key 26b is depressed or not (S601). When the data receiving key 26b is depressed, a receiving mode is started. In the receiving mode, the CPU 32b controls the data receiving device 24b to receive the stitch data from the data transmitting device 24a of the first automatic sewing machine 2a (S602).

The transmitting and receiving operation of the stitch data will now be described in more detail. The stitch data is constituted usually of a plurality of bytes. Accordingly, until all the bytes of the stitch data are received at the second automatic sewing machine 2b, a one-byte transmitting and receiving operation is repeated as described below.

First, the CPU 32a feeds a one-byte transmitting command to the control block 42a, and also feeds one byte of the stitch data to the transmitting data buffer 43a. At this time, the previously stored data in the transmitting data buffer 43a is deleted.

Then, in receipt of the transmitting command from the CPU 32a, the control block 42a outputs a transmitting demand signal to the control block 42b. Then, in receipt of the stitch data from the CPU 32a, the transmitting data buffer 43a outputs a data receipt signal to the control block 42a.

On the other hand, when the control block 42b receives the transmitting demand signal-from the control block 42a, the control block 42b determines whether or not the receiving data buffer 43b is blank (i.e., whether or not a data receipt signal has been previously generated from the receiving data buffer 43b and a reading demand signal has been thereafter output to the data receiving buffer 43b). If the data receiving buffer 43b is blank, the control block 42b outputs a transmitting permission signal to the control block 42a.

When receiving the transmitting permission signal from the control block 42b and receiving the data receipt signal from the transmitting data buffer 43a, the control block 42a outputs a transmitting demand signal to the transmitting data buffer 43a. In receipt of the transmitting demand signal from the control block 42a, the transmitting data buffer 43a outputs one byte of the stitch data to the receiving data buffer 43b.

When receiving one byte of the stitch data from the transmitting data buffer 43a, the receiving data buffer 43b outputs a data receipt signal to the control block 42b. When receiving the data receipt signal from the receiving data buffer 43b, the control block 42b transmits to the CPU 32b a signal informing that the stitch data is present in the receiving data buffer 43b. Accordingly, the CPU 32b determines that the stitch data is present in the receiving data buffer 43b (S603). Then, the CPU 32b transmits a reading command to the control block 42b. Then, the control block 42b transmits a reading demand signal to the receiving data buffer 43b.

When receiving the reading demand signal from the control block 42b, the receiving data buffer 43b outputs one byte of the stitch data to the CPU 32b. Then, the CPU 32b stores the one byte of the received stitch data into the RAM 36b. In the above operation, the CPU 32b generates the reading command only when the second automatic sewing machine 2b is in the receiving mode (S604).

When determining that the stitch data is not present in the receiving data buffer 43b at step S603, the CPU 32b determines whether or not the end key 51b is depressed. When the end key 51b is depressed (S605), the receiving operation is interrupted.

Thus, the transmitting and receiving operation of the stitch data by one byte is completed. Thereafter, until all the bytes of the stitch data are completely transmitted and received, the above operation is repeated.

Then, the CPU 32b determines whether or not all the bytes of the stitch data are received from the data receiving device 23b (S606). When determining that the receiving of the stitch data is not completed, the CPU 32b determines whether or not the end key 51b is depressed (S607). When the end key 51b is depressed, the receiving operation is interrupted.

On the other hand, when the CPU 32b determines all the bytes of the stitch data are received from the data receiving device 23b (S606), a message of the completion of the receiving is displayed on the display screen 16b (S608). After confirming the message of the completion, the operator can start sewing by depressing the sewing start key 41b. Then, the CPU 32b determines whether or not the sewing start key 41b is depressed (S609). When determining that the sewing start key 41b is depressed, the CPU 32b starts to control a sewing operation according to the received stitch data (S610). When determining that the end key 51b is depressed instead of the sewing start key 41b (S611), the CPU 32b interrupts the receiving operation.

The sewing operation according to the received stitch data is carried out in a manner similar to that in a usual automatic sewing machine; so, the explanation thereof will be omitted herein.

As apparent from the above description, the sewing system in the preferred embodiment is constituted of the first and second automatic sewing machines only, and the stitch data possessed by the first automatic sewing machine can be transmitted to the second automatic sewing machine. Accordingly, it is sufficient for the first automatic sewing machine only to have a function of converting the stitch data, thereby enabling all the sewing machines to perform a sewing operation according to the converted stitch data. Thus, the sewing system can be constructed at a lower cost than a sewing system constructed by connecting a commercially available computer to a plurality of sewing machines as in the prior art.

Although the cable CB is used for the communication between the first and second automatic sewing machines in this preferred embodiment, radio communication may be adopted according to the present invention.

Further, although the single receiving device is provided in the sewing system in the preferred embodiment, a plurality of receiving devices may be provided. In this case, a plurality of transmitting devices may be used, or a single transmitting device may be used with circuit switching means. In the case of using radio communication, a single transmitting device may be used without circuit switching means to simultaneously transmit data to a plurality of sewing machines on the receiving side.

Further, the RAM 36b in the sewing machine 2b on the receiving side has a capacity enough to store a series of stitch data as a whole in this preferred embodiment. However, to continuously drive the sewing machine on the receiving side, the RAM 36b may have at least a capacity allowing control of a driving speed of the needle to be continuously driven, that is, a capacity capable of storing stitch data corresponding to 20 to 30 stitches. In this case, the stitch data stored in the RAM 36b may be sequentially updated to continuously drive the sewing machine. Accordingly, the capacity of the RAM 36b can be reduced to thereby reduce the cost of the sewing machine.

Figure 7:
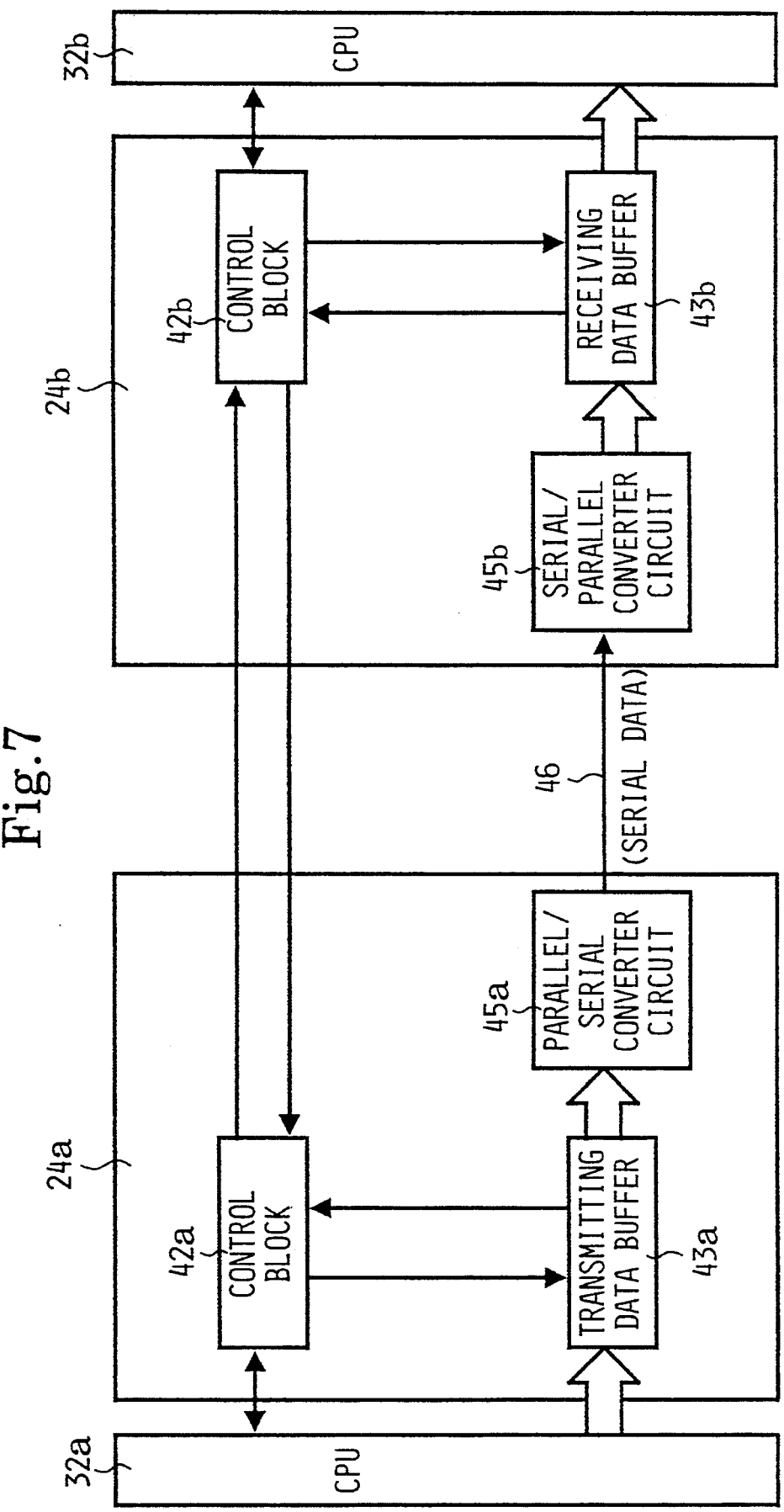
FIG. 7 is a block diagram showing an electrical construction of transmitting and receiving devices provided in a sewing system in another preferred embodiment according to the present invention.

In this preferred embodiment, the transmitting data buffer 43a and the receiving data buffer 43b are connected together by the data bus 44 to effect the transmission of stitch data by parallel data communication. In modification, as shown in FIG. 7, a parallel/serial converter circuit 45a may be connected to the transmitting data buffer 43a, and a serial/parallel converter circuit 45b may be connected to the receiving data buffer 43b. In this case, the parallel/serial converter circuit 45a and the serial/parallel converter circuit 45b may be connected together by a usual communication line 46 rather than the data bus 44. Thus, the transmission of stitch data may be effected by serial data communication using the communication line 46 (e.g., communication based on RS232C type device), thereby reducing a manufacturing cost.

Although the single sewing machine on the receiving side is provided in the sewing system in the preferred embodiment, a plurality of sewing machines on the receiving side may be provided. In this case, a certain one of the plural sewing machines on the receiving side may be selected and data may be transmitted to this selected sewing machine only. Further, in the case where the data is constituted of plural kinds of data, a certain kind of data may be selected according to the sewing machines on the receiving side. That is, if the sewing machines on the receiving side are different in sewing capacity, a certain kind of data optimum for the sewing capacity of a certain one of the sewing machines may be selected to be transmitted, thereby increasing sewing efficiency.

Even when a control code for controlling the sewing machine on the receiving side is different from a control code for controlling the sewing machine on the transmitting side, the CPU 32a in the sewing machine on the transmitting side may have a code converting function, whereby it is only necessary for an operator to have skills in an inputting method for the control code on the transmitting side. Thus, the operator can operate the sewing machine on the receiving side even without the knowledge of the control code on the receiving side.

As described above, the sewing system according to the present invention is constituted of the automatic sewing machines only, and the stitch data possessed by one of the sewing machines can be transmitted to the other sewing machines. Accordingly, it is sufficient for one of the sewing machines only to have a function of converting the stitch data, thereby enabling all the sewing machines to perform a sewing operation according to the converted stitch data. Thus, the sewing system can be constructed at a lower cost than a sewing system constructed by connecting a commercially available computer to a plurality of sewing machines as in the prior art.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A sewing system including a first sewing machine and at least one second sewing machine, each of the first and second sewing machines comprising:
   a stitch forming means for forming stitches on a workpiece;
   a workpiece moving means for moving the workpiece relative to the stitch forming means; and
   a sewing control means for controlling the stitch forming means and the workpiece moving means to execute a sewing operation according to stitch data, wherein
   the first sewing machine further comprises
   a memory means for storing stitch data;
   a data processing means for processing the stitch data stored in the memory means and allowing the processed stitch data to be stored in the memory means; and
   a data transmitting means for transmitting the stitch data stored in the memory means to the second sewing machine, and wherein
   the second sewing machine further comprises a data receiving means for receiving the stitch data transmitted from the data transmitting means, wherein the sewing control means of the second sewing machine controls the stitch forming means and the workpiece moving means of the second sewing machine according to the stitch data received by the data receiving means.

2. The sewing system as claimed in claim 1, wherein the second sewing machine further comprises a memory means for storing the stitch data received at the data receiving means.

3. The sewing system as claimed in claim 2, wherein the second sewing machine further comprises display means for displaying an indication that the stitch data transmitted from the data transmitting means is completely received.

4. The sewing system as claimed in claim 2, wherein the first sewing machine further comprises display means coupled to the data processing means for displaying the stitch data stored in the memory means of the first sewing machine.

5. The sewing system as claimed in claim 4, wherein the memory means includes means for storing embroidery data for forming an embroidery pattern.

6. The sewing system as claimed in claim 5, wherein the workpiece moving means includes an embroidery frame means for supporting the workpiece.

7. The sewing system as claimed in claim 2, wherein the data receiving means includes receiving instructing means for instructing a start of data receiving by the data receiving means and entering the second sewing machine in a data receiving mode.

8. The sewing system as claimed in claim 7, wherein the second sewing machine further comprises display means for displaying an indication that the stitch data output from the data transmitting means is completely received.

9. The sewing system as claimed in claim 7, wherein the receiving instructing means includes a receiving key for designating the start of the data receiving.

10. The sewing system as claimed in claim 7, wherein the sewing control means of the second sewing machine includes sewing instructing means for instructing a start of the controlling of the stitch forming means and the workpiece moving means of the second sewing machine to execute the sewing operation.

11. The sewing system as claimed in claim 10, wherein the sewing instructing means includes a sewing start key for designating the start of the controlling to execute the sewing operation.

12. The sewing system as claimed in claim 10, wherein the first sewing machine further comprises display means coupled to the data processing means for displaying the stitch data stored in the memory means of the first sewing machine.

13. A method of executing a sewing operation using at least two sewing machines comprising the steps of:
   reading out stitch data from a memory means in a first sewing machine;
   processing the stitch data read out from the memory means in the first sewing machine;
   storing the processed stitch data into the memory in the first sewing machine;
   transmitting the processed stitch data from a transmitting means of the first sewing machine to a receiving means of a second sewing machine;
   receiving the processed stitch data transmitted from the transmitting means of the first sewing machine at the receiving means of the second sewing machine; and controlling a forming operation for forming stitches on a workpiece and a moving operation for moving a workpiece relative to a stitch forming means of the second sewing machine according to the stitch data received at the receiving means in the second sewing machine.

14. A method of executing a sewing operation as claimed in claim 13, further comprising the step of storing the processed stitch data received at the receiving means into a memory means in the second sewing machine.

15. A method of executing a sewing operation as claimed in claim 14 further comprising the steps of:

displaying an indication of completion of the receiving step in the second sewing machine; and instructing a start of the controlling step after the displaying of the completion of the receiving step in the second sewing machine.

16. A method of executing a sewing operation as claimed in claim 15, further comprising the step of instructing a start of the receiving step, wherein the receiving step includes entering the second sewing machine into a data receiving mode in response to the instructing of the start of the receiving step.

17. A method of executing a sewing operation as claimed in claim 16, wherein the processing step includes displaying the stitch data read out from the memory means of the first sewing machine.

18. A method of executing a sewing operation as claimed in claim 14, wherein the processing step includes displaying the stitch data read out from the memory means of the first sewing machine.

19. A method of executing a sewing operation as claimed in claim 18, wherein the step of reading out stitch data from the memory means includes reading out data for forming an embroidery pattern.

20. A method of executing a sewing operation as claimed in claim 19, wherein the step of controlling includes moving an embroidery frame means to control the moving operation.

* * * * *